(12) United States Patent
Chuang et al.

(10) Patent No.: US 6,523,977 B2
(45) Date of Patent: Feb. 25, 2003

(54) ILLUMINATING APPARATUS INCLUDING A PLURALITY OF LIGHT SOURCES THAT GENERATE PRIMARY COLOR LIGHT COMPONENTS

(75) Inventors: Fu-Ming Chuang, Hsin-Chu Hsien (TW); Shih-Ping Lee, Hsin-Chu (TW); Sheng-Hsiung Chan, Hsin-Chu Hsien (TW); Han-Wen Tsai, Hsin-Chu Hsien (TW)

(73) Assignee: Prokia Technology Co., Ltd., Tainan Hsien (TW)

( * ) Notice: Subject to any disclaimer, the term of this patent is extended or adjusted under 35 U.S.C. 154(b) by 0 days.

(21) Appl. No.: 09/789,229

(22) Filed: Feb. 20, 2001

(65) Prior Publication Data

US 2002/0114157 A1 Aug. 22, 2002

(51) Int. Cl.$^7$ .................................................. F21V 9/00
(52) U.S. Cl. ........................ 362/231; 362/800; 362/249; 362/259; 362/296; 362/297; 362/346
(58) Field of Search ................................ 362/231, 259, 362/268, 297, 800, 296, 341, 346

(56) References Cited

U.S. PATENT DOCUMENTS

| | | | |
|---|---|---|---|
| 5,631,721 A | 5/1997 | Stanton et al. ................. 355/71 |
| 5,636,003 A | * 6/1997 | Tanitsu et al. ................. 355/53 |
| 5,659,409 A | * 8/1997 | Ooi et al. ...................... 349/10 |
| 5,754,278 A | * 5/1998 | Kurtz ........................... 372/50 |
| 5,808,759 A | * 9/1998 | Okamori et al. .............. 349/67 |
| 5,851,063 A | * 12/1998 | Doughty et al. ............. 362/231 |
| 5,961,201 A | * 10/1999 | Gismondi ....................... 362/1 |
| 6,102,552 A | * 8/2000 | Tullis .......................... 362/235 |
| 6,139,166 A | * 10/2000 | Marshall et al. ............. 362/230 |
| 6,174,060 B1 | * 1/2001 | Imaoka et al. ................. 349/9 |
| 6,231,193 B1 | * 5/2001 | Sugawara ................... 353/102 |
| 6,257,737 B1 | * 7/2001 | Marshall et al. ............. 362/231 |
| 6,273,589 B1 | * 8/2001 | Weber et al. ................ 362/230 |
| 6,344,929 B1 | * 2/2002 | Sugawara ................... 359/622 |
| 2001/0033418 A1 | 10/2001 | Hayashi ....................... 359/487 |
| 2002/0015306 A1 | 2/2002 | Yamamoto ................... 362/293 |

* cited by examiner

Primary Examiner—Thomas M. Sember
Assistant Examiner—John Amarantides
(74) Attorney, Agent, or Firm—Merchant & Gould P.C.

(57) ABSTRACT

An illuminating apparatus includes a plurality of light sources that generate a plurality of primary color light components, a reflector unit for receiving the primary color light components from the light sources, and an integrator having an input side to receive the primary color light components reflected by the reflector unit.

3 Claims, 6 Drawing Sheets

ILLUMINATING APPARATUS INCLUDING A PLURALITY OF LIGHT SOURCES THAT GENERATE PRIMARY COLOR LIGHT COMPONENTS

BACKGROUND OF THE INVENTION

1. Field of the Invention

The invention relates to an illuminating apparatus for a projection display, more particularly to an illuminating apparatus that utilizes a plurality of primary color light sources to generate input light for a projection display.

2. Description of the Related Art

In a conventional projection display, input light is filtered and separated into color components that are modulated and subsequently recombined to generate an image output.

Referring to FIG. 1, a conventional illuminating apparatus 1 that is used to generate input light for a projection display (not shown) is shown to include an elliptic reflector 11, a single lamp 14 serving as a light source, and a rod integrator 15. The elliptic reflector 11 has first and second focal points 12, 13. The lamp 14 is disposed at the first focal point 12. The elliptic reflector 11 reflects light rays that radiate from the lamp 14. The integrator 15 has an input side 150 coincident with the second focal point 13 such that the light rays reflected by the elliptic reflector 11 converge at the input side 150. Light from the integrator 15 is subsequently processed by 2 condensers 16, 17 and is filtered and separated into primary color components, such as red, blue and green color components.

Referring to FIG. 2, another conventional illuminating apparatus 2 for a projection display 25 is shown to include a single light source 21, a parabolic reflector 22, and first and second lens array integrators 23, 24. The light source 21 is disposed at a focal point of the parabolic reflector 22. The first lens array integrator 23 is disposed between the parabolic reflector 22 and the second lens array integrator 24. The parabolic reflector 22 reflects light rays, which radiate from the light source 21, in parallel toward the first and second lens array integrator 23, 24. Light from the integrators 23, 24 is processed, such as by filtering, color separation and modulation before being projected on a display screen.

The light source used in the aforesaid conventional illuminating apparatuses 1, 2 can be a halogen lamp or an arc lamp, such as a high-voltage mercury lamp, a metal halide lamp and a xenon lamp. The following are some of the drawbacks of the conventional illuminating apparatuses 1, 2:

1. Since the light source is similar to incandescent light, the light therefrom can hardly be separated into pure color components due to limitations of the color separation device, thereby resulting in low color purity of the image output.
2. Due to low color purity, color characteristics are difficult to adjust, thereby resulting in an image output with a narrow color band region and in difficulty in attaining natural color rendering.
3. Due to the high power consumption and high heat generation of the light source, the light source has a relatively short service life. Furthermore, when the single light source breaks down, the conventional illuminating apparatus cannot work.
4. Since ultraviolet and infrared rays in the light source should be filtered prior to color separation, special filter lenses are necessary, thereby resulting in a relatively high cost.

SUMMARY OF THE INVENTION

Therefore, the main object of the present invention is to provide an illuminating apparatus that utilizes a plurality of primary color light sources to generate input light for a projection display which can overcome the drawbacks associated with the aforesaid prior art.

According to the present invention, an illuminating apparatus comprises:
- a plurality of light sources that generate a plurality of primary color light components;
- a reflector unit for receiving the primary color light components from the light sources; and
- an integrator having an input side to receive the primary color light components reflected by the reflector unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
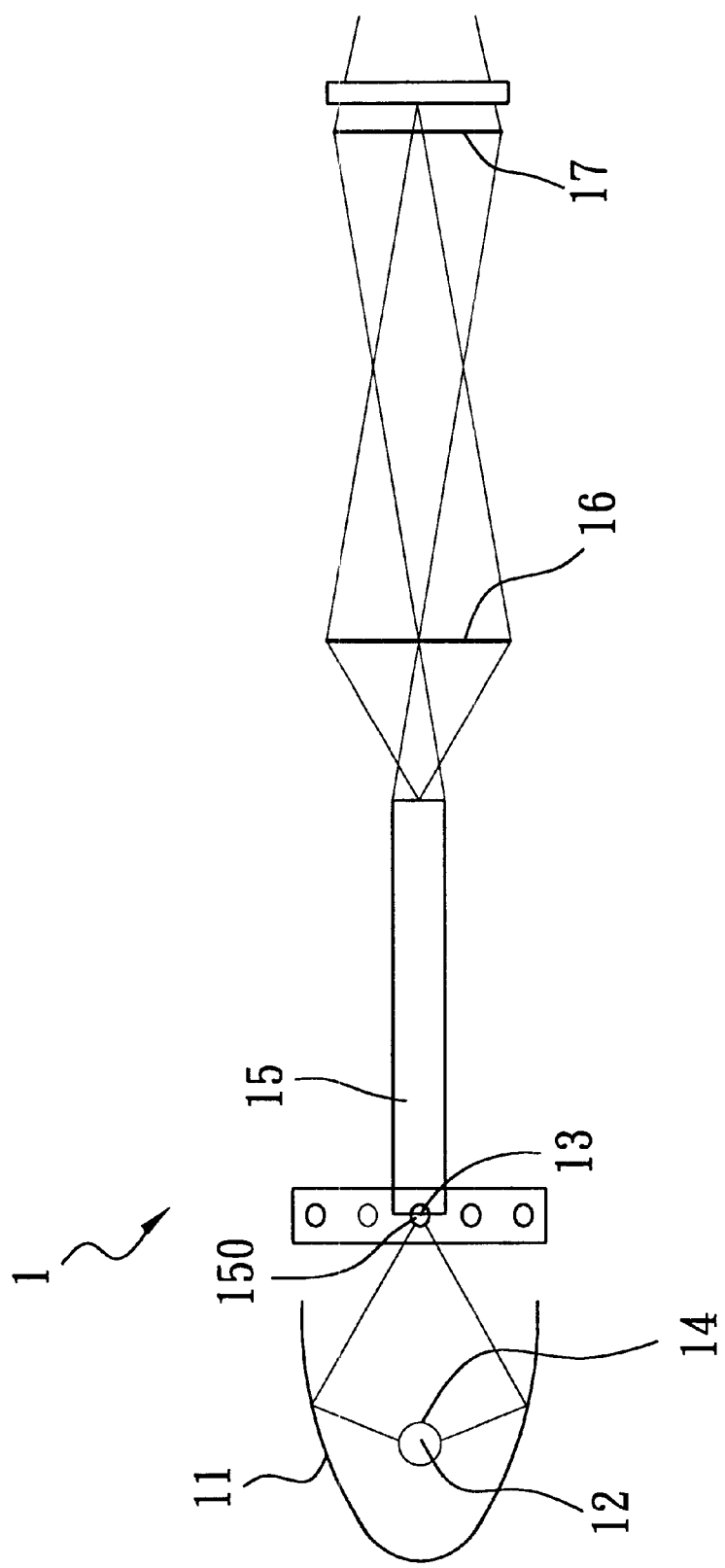
FIG. 1 is a schematic view of a conventional illuminating apparatus.
Figure 2:
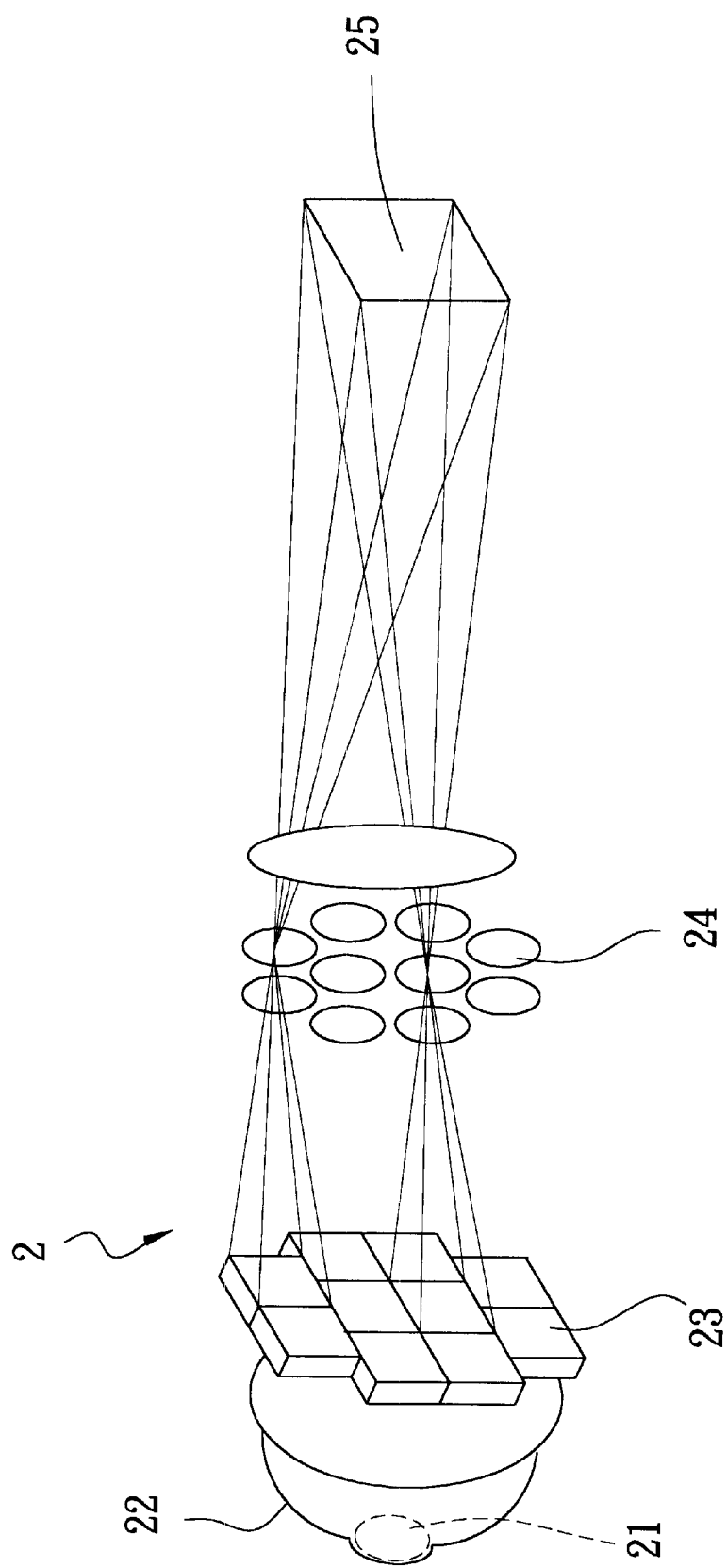
FIG. 2 is a perspective view of another conventional illuminating apparatus.
Figure 3:
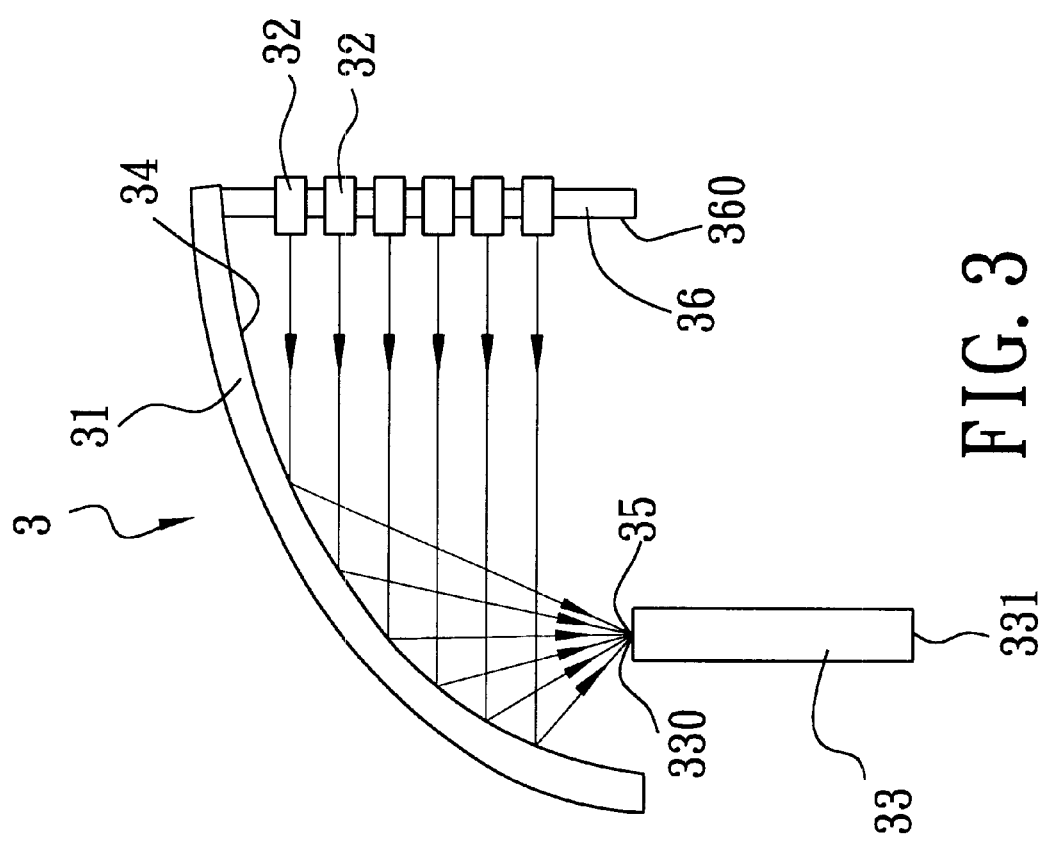
FIG. 3 is a schematic view of the first preferred embodiment of an illuminating apparatus according to this invention.

Referring to FIG. 3, the first preferred embodiment of an illuminating apparatus 3 according to the present invention is shown to comprise a plurality of light sources 32, a reflector unit, and a bar-shaped integrator 33.

The light source 32, such as light emitting diodes or laser diodes, generate a plurality of primary color light components, such as red, green and blue light components.

In this embodiment, the reflector unit includes a parabolic reflector 31 having a reflecting surface 34 in the form of a parabolic segment, and a focal point 35. The parabolic reflector 31 receives the primary color light components from the light sources 32.

An elongated base board 36 has a mounting surface 360 that confronts the reflecting surface 34. The light sources 32 are mounted on the mounting surface 360, and are spaced apart from each other such that the primary color light components generated by the light sources 32 are radiated in parallel toward the reflecting surface 34.

The integrator 33 has an input side 330 to receive the primary color light components reflected by the reflector unit. The input side 330 of the integrator 33 is coincident with the focal point 35 such that the primary color light components reflected by the reflecting surface 34 converge at the input side 330. As such, input light for a projection display (not shown) can be obtained from an output side 331 of the integrator 33.

Figure 4:
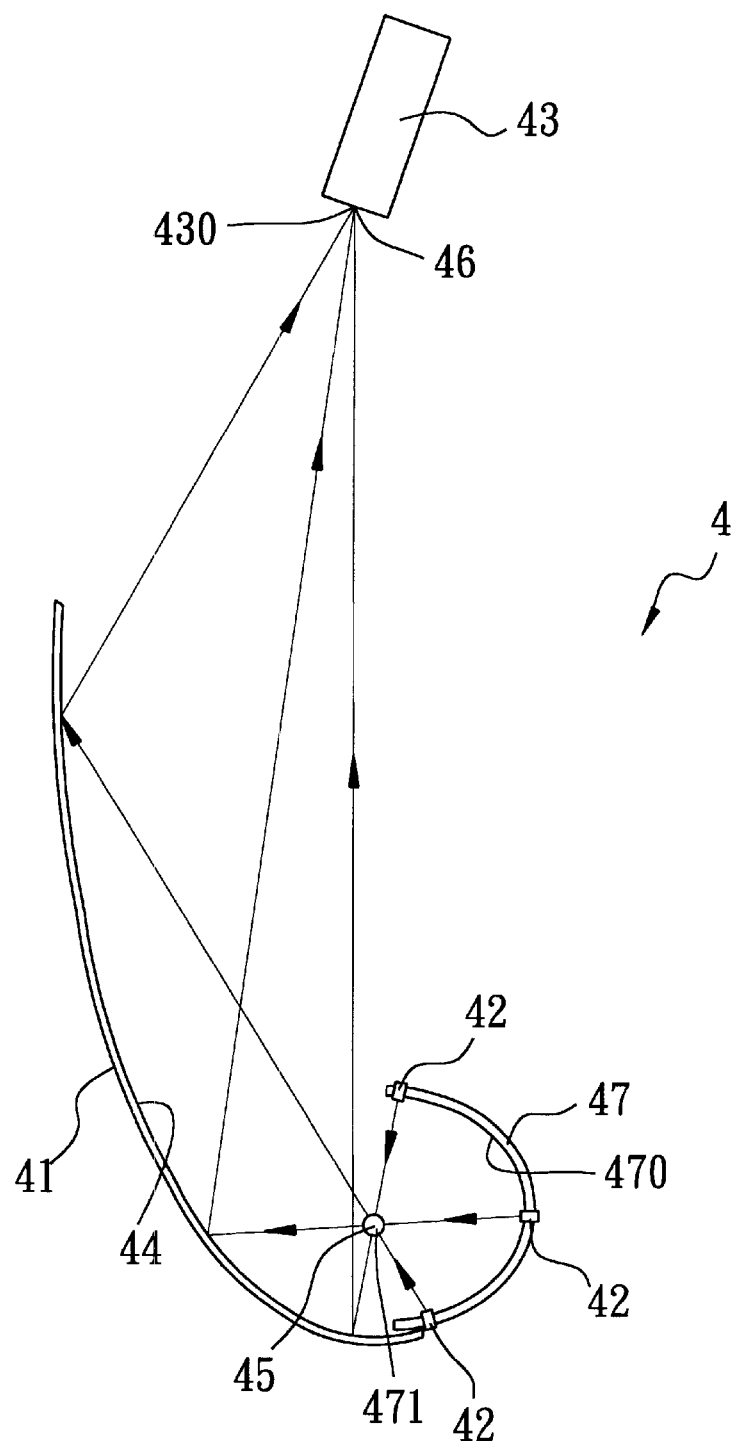
FIG. 4 is a schematic view of the second preferred embodiment of an illuminating apparatus according to this invention.

Referring to FIG. 4, the second preferred embodiment of an illuminating apparatus 4 according to the present invention is shown to comprise a plurality of light sources 42, a reflector unit, and a rod integrator 43.

The light source 42 are similar to the light sources 32 of the previous embodiment.

In this embodiment, the reflector unit includes an elliptic reflector 41 having a reflecting surface in the form of an elliptic segment, and first and second focal points 45, 46.

A curved base board 47 has a semi-circular concave mounting surface 470 that confronts the reflecting surface 44, that has the light sources 42 mounted thereon, and that has a third focal point 471 coincident with the first focal point 45 such that the primary color light components generated by the light sources 42 are radiated toward the reflecting surface 44.

The integrator 43 has an input side 430 to receive the primary color light components reflected by the reflector unit. The input side 430 of the integrator 43 is coincident with the second focal point 46 such that the primary color light components reflected by the reflecting surface 44 converge at the input side 430. As such, input light for a projection display (not shown) can be obtained from an output side 431 of the integrator 43.

Figure 5:
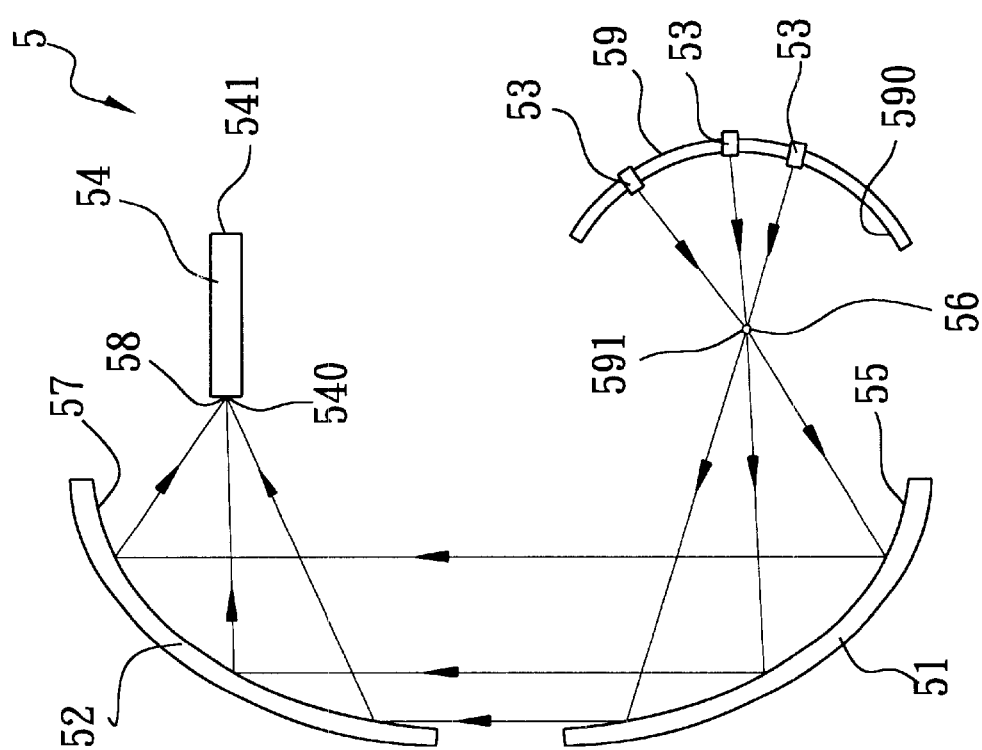
FIG. 5 is a schematic view of the third preferred embodiment of an illuminating apparatus according to this invention.

Referring to FIG. 5, the third preferred embodiment of an illuminating apparatus 5 according to the present invention is shown to comprise a plurality of light sources 53, a reflector unit, and a rod integrator 54.

The light source 53 are similar to the light sources 32, 42 of the previous embodiments.

In this embodiment, the reflector unit includes first and second parabolic reflectors 51, 52. The first parabolic reflector 51 has a reflecting surface 55 in the form of a semi-parabolic segment, and a first focal point 56. The second parabolic 52 has a second reflecting surface 57 in the form of a semi-parabolic segment that confronts the reflecting surface 55 of the first parabolic reflector 51, and a second focal point 58.

A curved base board 59 has a semi-circular concave mounting surface 590 that confronts the reflecting surface 55 of the first parabolic reflector 51, that has the light sources 53 mounted thereon, and that has a third focal point 591 coincident with the first focal point 56. As such, the reflecting surface 55 of the first parabolic reflector 51 reflects the primary color light components generated by the light sources 53 in parallel toward the second reflecting surface 57.

The integrator 54 has an input side 540 to receive the primary color light components reflected by the reflector unit. The input side 540 is coincident with the second focal point 58 such that the primary color light components reflected by the second reflecting surface 57 converge at the input side 540. As such, input light for a projection display (not shown) can be obtained from an output side 541 of the integrator 54.

Figure 6:
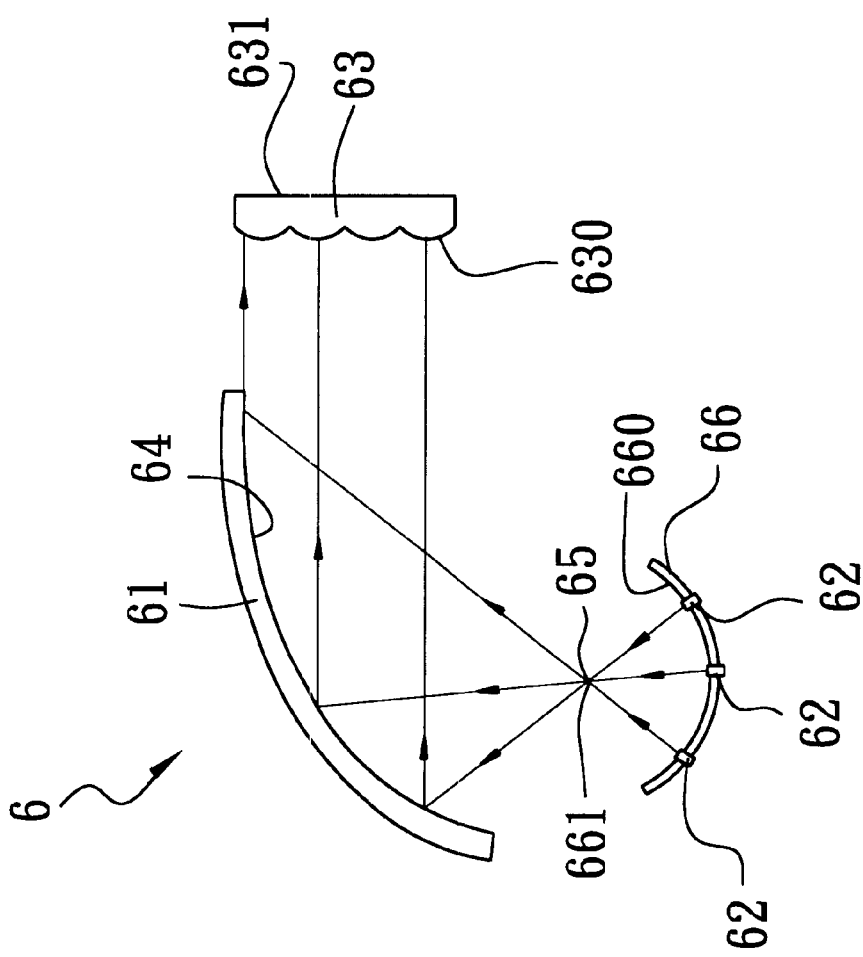
FIG. 6 is a schematic view of the fourth preferred embodiment of an illuminating apparatus according to this invention.

Referring to FIG. 6, the fourth preferred embodiment of an illuminating apparatus 6 according to the present invention is shown to comprise a plurality of light sources 62, a reflector unit, and an integrator 63.

The light sources 62 are similar to the light sources 32, 42, and 53 of the previous embodiments.

In this embodiment, the reflector unit includes a parabolic reflector 61. The parabolic reflector 61 has a reflecting surface 64 in the form of a parabolic segment, and a first focal point 65.

A curved base board 66 has a semi-circular concave mounting surface 660 that confronts the reflecting surface 64 of the parabolic reflector 61, that has the light sources 62 mounted thereon, and that has a second focal point 661 coincident with the first focal point 65. As such, the reflecting surface 64 of the parabolic reflector 61 reflects the primary color light components generated by the light sources 62 in parallel toward the integrator 63.

In this embodiment, the integrator 63 is a lens array integrator, which has an input side 630 to receive the primary color light components reflected by the reflecting surface 64. As such, input light for a projection display (not shown) can be obtained from an output side 631 of the integrator 63.

It is noted that the illuminating apparatus of the present invention utilizes light emitting diodes or laser diodes as the light sources which generate primary color light components. Therefore, after a color splitting process, the input light can be split into red, green and blue color components with high color purity and high reliability. Color characteristics are thus easy to adjust so as to obtain a wide color band region and so as to easily attain natural color rendering. The light emitting diodes and laser diodes have relatively long service lives, and can be operated at a lower voltage, thereby resulting in lower power consumption, lower heat generation, and increased safety. In addition, when one of the diodes breaks down, the illuminating apparatus can still work as long as the remaining diodes are operable. Furthermore, the input light need not be filtered to remove ultraviolet and infrared rays, thereby dispensing with the special filter required in the prior art to result in a relatively low cost. The object of the invention is thus met.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. An illuminating apparatus comprising:

a plurality of light sources that generate a plurality of primary color light components, a reflector unit for receiving the primary color light components from said light sources, said reflector unit including a first parabolic reflector having a reflecting surface and a first focal point, and a second parabolic reflector having a second reflecting surface that confronts said reflecting surface of said first parabolic reflector and a second focal point;

a curved base board having a concave mounting surface that confronts said reflecting surface of said first parabolic reflector, that has said light sources mounted thereon, and that has a third focal point coincident with said first focal point, said reflecting surface of said first parabolic reflector reflecting the primary color light components in parallel toward said second reflecting surface; and an integrator having an input side to receive the primary color light components reflected by said reflector unit, said input side of said integrator being coincident with said second focal point.

2. The illuminating apparatus of claim 1, wherein said light sources include a plurality of light emitting diodes.

3. The illuminating apparatus of claim 1, wherein said light sources include a plurality of laser diodes.

* * * * *